United States Patent

[11] 3,579,855

[72] Inventors Maurice Reginald Worthy;
Clive Reginald Worthy, 398 Moreland Park, West Brunswick, Victoria, Australia
[21] Appl. No. 730,153
[22] Filed May 17, 1968
[45] Patented May 25, 1971
[32] Priority May 17, 1967
[33] Australia
[31] 21891/67

[54] TEACHING MACHINES
8 Claims, 7 Drawing Figs.
[52] U.S. Cl. ................................................ 35/8
[51] Int. Cl. .............................................. G09b 5/06
[50] Field of Search ............................... 35/9, 48, 8, 8.1; 350/291

[56] References Cited
UNITED STATES PATENTS

| | | | |
|---|---|---|---|
| 3,266,172 | 8/1966 | Heinberg | 35/8 |
| Re23,030 | 8/1948 | Holt | 35/9X |
| 1,199,882 | 10/1916 | Frey | 350/291 |
| 3,103,750 | 9/1963 | Werner | 35/9 |
| 3,277,588 | 10/1966 | Lynott et al. | 35/9 |
| 3,308,559 | 3/1967 | Kirkconnell et al. | 35/9 |

Primary Examiner—Wm. H. Grieb
Attorney—Sughrue, Rothwell, Mion, Zinn and Macpeak

ABSTRACT: A teaching machine having means to display a plurality of items of visual information and to reproduce audio information. The visual information carrier is intermittently advanced to present new items. Means are provided to cause reproduction of the sound information during a portion of the dwell period of each visual item and to render the reproduction means ineffective while the visual information carrier is advancing to a new item.

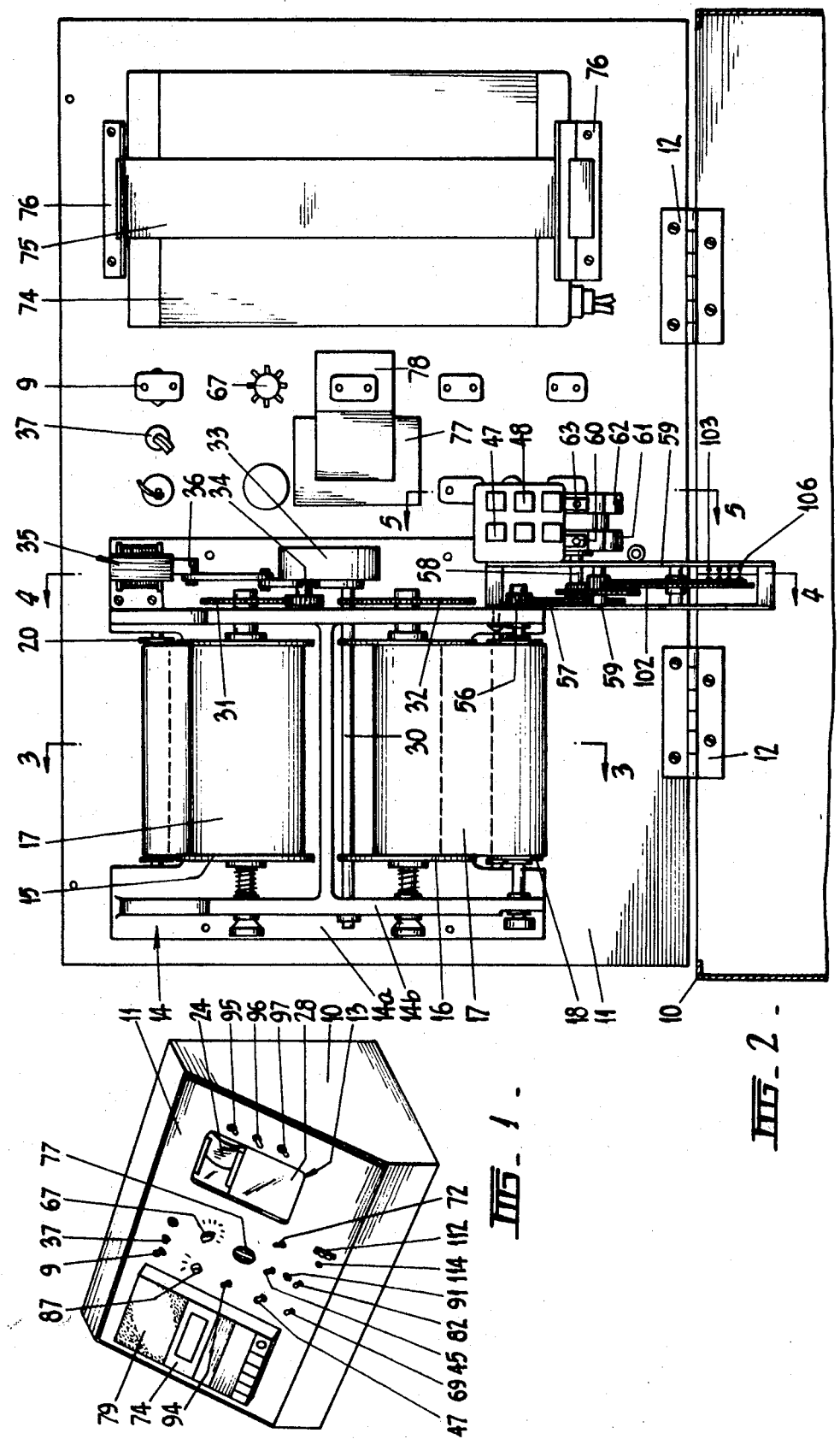

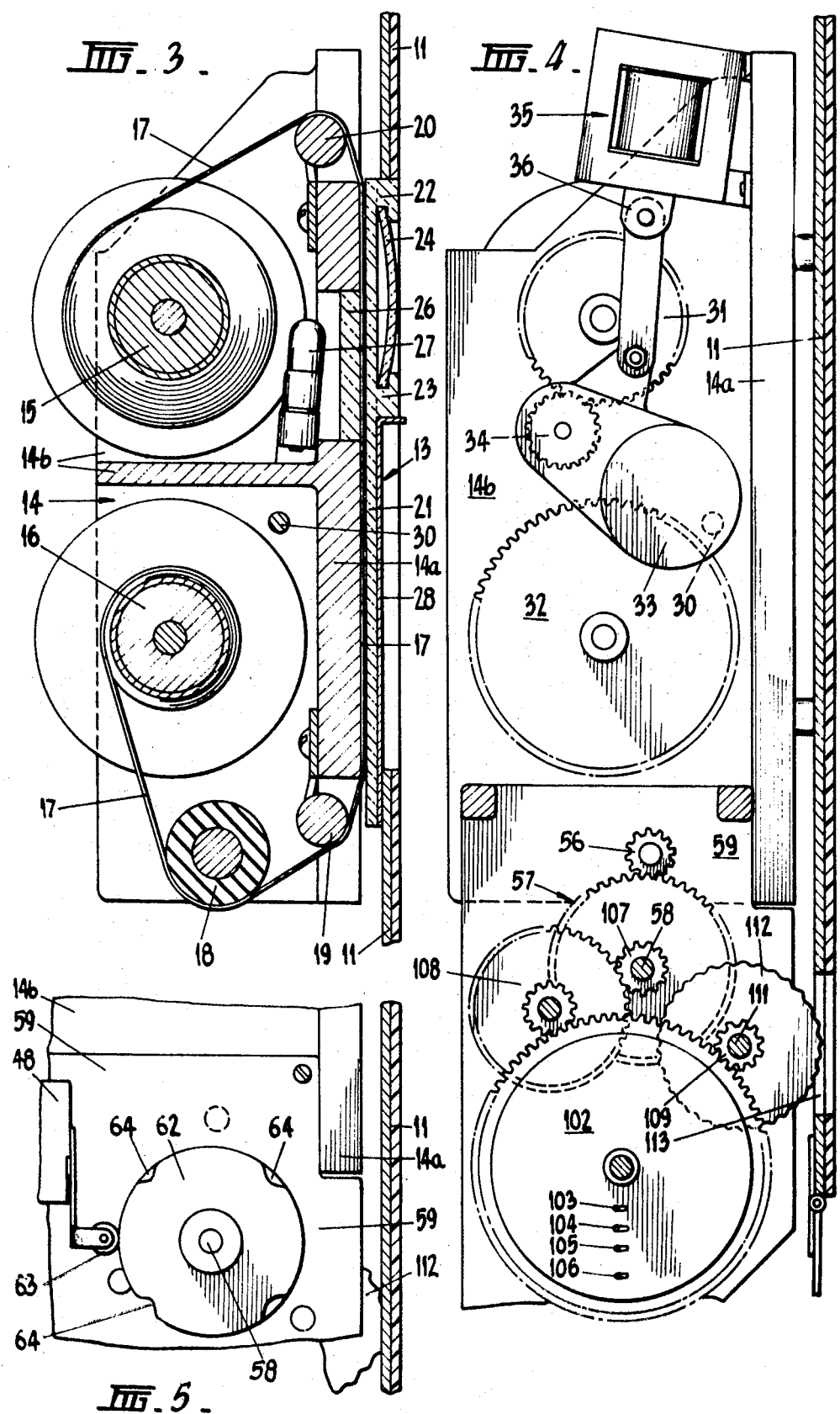

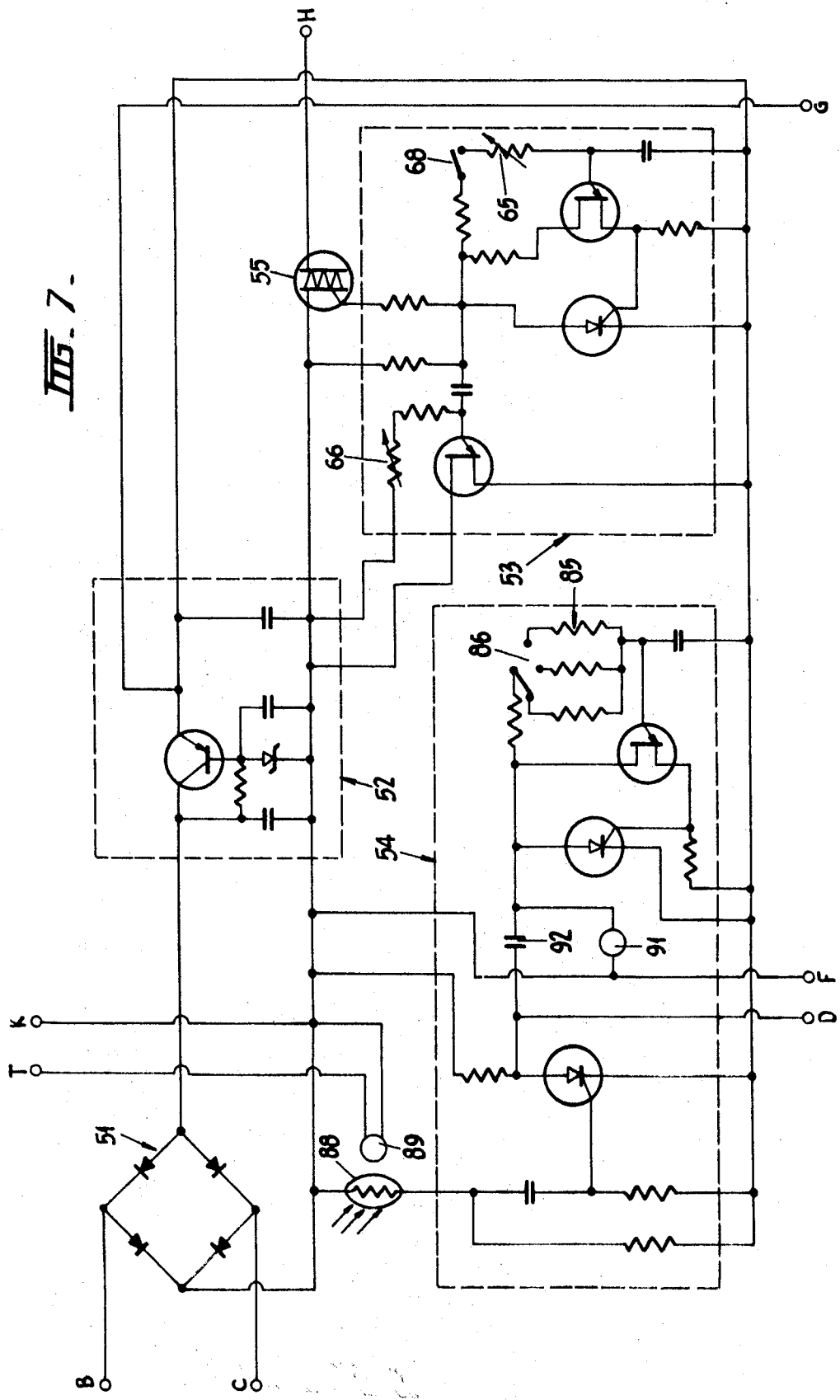

TEACHING MACHINES

The present invention relates to teaching machines and particularly but not exclusively to machines intended to assist a student in remembering individual items of a particular subject, for instance vocabulary in language studies or formulas in scientific subjects.

According to the present invention there is provided a teaching machine comprising a member having an observation window formed therein and drive means to drive a data carrier such that portions of the carrier are successively brought into alignment with said window.

Preferably, the teaching machine is further provided with screening means normally effective to screen part of each said portion of the carrier when that portion is aligned with the window, and descreening means operable to render the screening means ineffective.

Conveniently, said drive means comprises an electric motor, and a control device may be provided automatically to stop the motor, and therefore the carrier, after the carrier has moved a predetermined distance. Also, there may be provided initiator means operable on stopping of the motor to restart the motor after a predetermined delay.

Preferably, energizing means are provided to energize the drive motor of an associated tape recorder during the delay, whereby a spoken commentary may be associated with the data carried by the carrier; said energizing means is conveniently automatically triggered when the motor stops.

The teaching machine may also be provided with motor initiator means which comprises a plurality of manually actuable switches connected in a circuit with said motor and with switching means which is conditionable by movement of the data carrier selectively to connect and disconnect the switches to and from the motor.

In order to give a clear understanding of the invention one embodiment thereof will now be described with reference to the accompanying drawings in which:

FIG. 1 is a perspective view from above and one side of a teaching machine in accordance with the invention;

FIG. 2 is a view of the rear of a movable-front panel of the machine shown in FIG. 1;

FIG. 3 is a section on the line 3-3 in FIG. 2;

FIG. 4 is a section on the line 4-4 in FIG. 2;

FIG. 5 is a view taken on the line 5-5 in FIG. 2;

FIG. 7 is a circuit diagram of the circuit portion contained within box 7 in FIG. 6.

Figure 6:
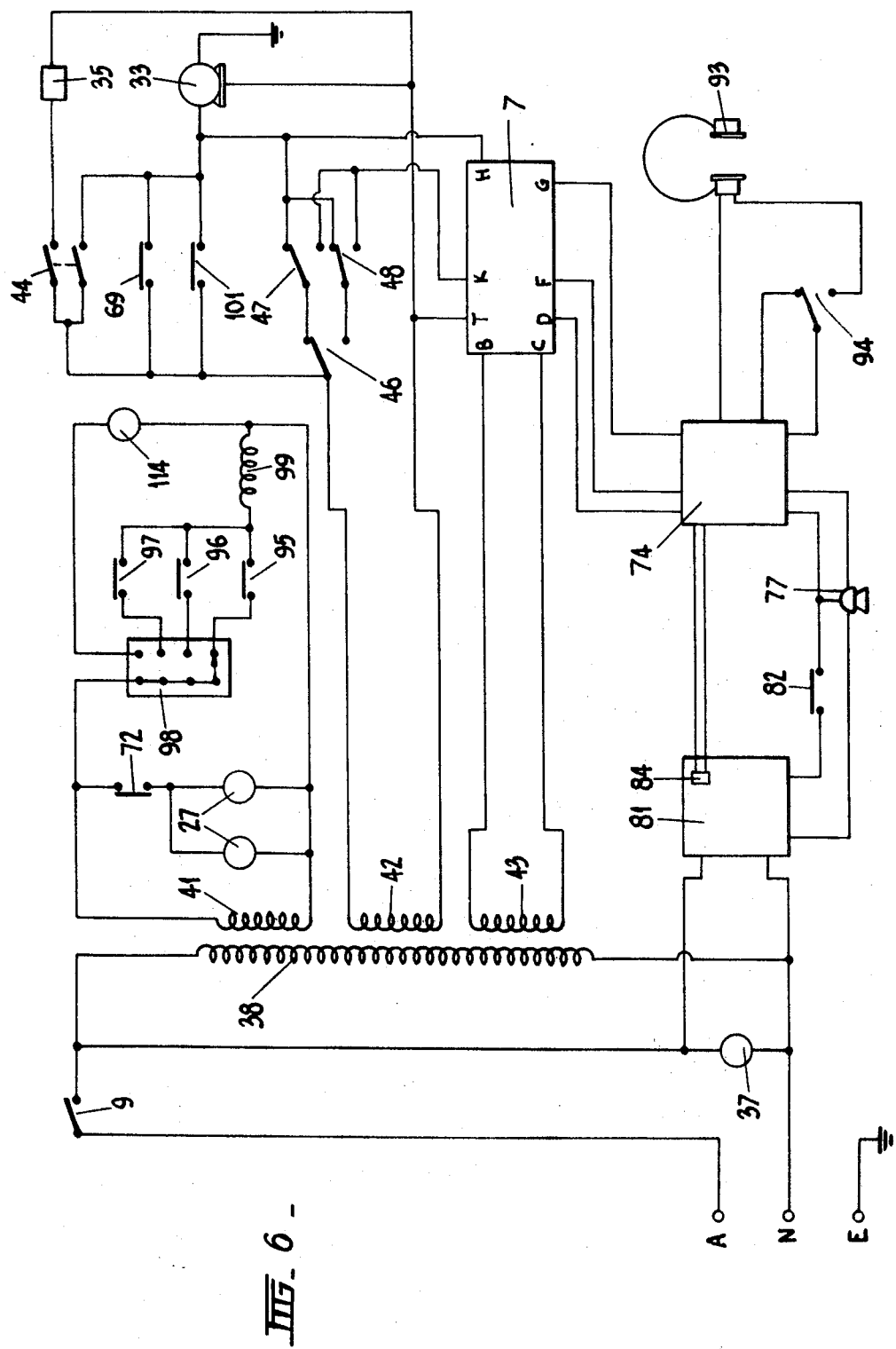
FIG. 6 is a circuit diagram showing the circuitry of the machine shown in FIGS. 1 to 5.

As seen in FIG. 1, the machine comprises a casing 10 having a front panel 11 which is inclined to the vertical when the machine is in its normal working disposition. Panel 11 is connected to the body of casing 10 by hinges 12 (FIG. 2) located internally of casing 10 at the lower edge of panel 11. The panel is swingable about the axes of hinges 12 away from the body of casing 10 to reveal the mechanism of the machine as shown in FIG. 2.

At its right-hand side, as viewed from the front, panel 11 has an opening 13 behind which is mounted a casting 14 (FIG. 2). Casting 14 comprises a plate 14a which abuts the rear face of panel 11, and a rearward projection 14b which is shaped as an H. Rollers 15 and 16 are rotatably mounted between the uprights of the H. In use, rollers 15, 16 receive respective ends of a sheet of paper 17 upon which data is printed. As best seen in FIG. 3, sheet 17 extends around a roller system comprising a control roller 18, which is mounted between the lower uprights of H portion 14b, and a pair of idler rollers 19, 20, which are mounted in recesses in the ends of plate 14a. In extending between idler rollers 19, 20, sheet 17 passes behind opening 13 in panel 11, and is supported along this portion of its run by plate 14a.

Mounted in opening 13 is a transparent plate 21, (FIG. 3) which is formed with transverse ribs 22, 23 at and adjacent its upper end respectively. Ribs 22, 23 have facing grooves which carry a partially silvered mirror 24. Mirror 24 screens half the width of opening 13, and is slidable in its guide grooves transversely of the opening. Plate 21 is slidable vertically relative to panel 11 and is located by frictional engagement with the panel and with paper 17 or plate 14a. In one use of the machine which will be described hereinafter, plate 21 is located with rib 22 in engagement with the upper edge of opening 13 (FIG. 3). Plate 14a is provided with a transverse slot 25 in alignment with the mirror 24 and a transparent sheet 26 is located in this slot. Mounted on plate 14a behind sheet 26 are a pair of small electric bulbs 27, only one of which is seen in FIG. 3. Energization of these bulbs causes light to pass through plates 26, paper 17 and plate 21 so that mirror 24 then appears as a darkened sheet of glass through which data printed on sheet 17 is visible. An opaque plate 28 is located between plate 21 and panel 11 and can be brought into engagement with rib 23 to obscure the portion of sheet 17 disposed behind the lower portion of opening 13.

As will be described in greater detail hereinafter, rollers 15, 16 can be rotated in either direction to align successive portions of sheet 17 with the observation "window" constituted by the portion of plate 21 between ribs 22, 23. Half of the portion of the sheet aligned with the window will in normal circumstances be screened by mirror 24 and will carry the answer to a question which is carried on the other half. When the observer wishes to check his answer, he energizes bulbs 27.

As seen in FIG. 2, the shafts of rollers 15, 16 extend through the right-hand uprights of H portion 14b and carry respective sprockets 31, 32. An electric drive motor 33 is pivotally mounted on a shaft 30 extending through the adjacent uprights of H portion 14b. Motor 33 has an output gear 34 and is pivotable between two positions, in one of which gear 34 meshes with sprocket 31, (as seen in FIGS. 2 and 4), and the other of which gear 34 meshes with sprocket 32. Motor 33 is resiliently biased, by means not shown, so that under normal circumstances gear 34 meshes with sprocket 32. Hence, sheet 17 is normally moved downwardly relative to opening 13. However, motor 33 can be pivoted to its second position by energization of a solenoid 35, the armature 36 of which is connected via a pivotal linkage with motor 33.

Control of motor 33 is effected by means of the circuit illustrated in FIGS. 6 and 7. The circuitry illustrated in these FIGS. includes controls for a number of other features of the machine which have not yet been described, but the immediately following description relates only to the control system required for those operations of the motor which have been described above.

In FIG. 6, terminals A, N and E are the active neutral and earth terminals of an electric supply. The machine is connected to these terminals via a suitable plug, and casing 10, is earthed via terminal E. Within the machine, power from the supply is connected via a main on/off switch 9 to the primary winding 38 of a transformer. A lamp 37 mounted in panel 11 and connected across the primary winding indicates when power is being supplied to the machine. The transformer has three secondary windings indicated at 41, 42 and 43 in FIG. 6. Drive motor 33 is connected across winding 42 by way of an array of switches which includes a pair of ganged switches 44 operable by a toggle 45 which projects from the front of panel 11. Closure of switches 44 feeds power to motor 33 and to solenoid 35, thereby causing reverse operation of the paper drive. Under normal circumstances therefore, switches 44 are open as seen in FIG. 6.

Connected in series with winding 42 and motor 33 is a three pole toggle switch 46, the toggle of which projects from panel 11. Switch 46 feeds power to either of a pair of three-pole cam-operated switches 47, 48. Considering first switch 47, in one condition of the switch power can be fed to motor 33 to cause forward operation of the motor, and in the other condition, power can be fed to the control circuit shown in FIG. 7. Switch 48 is similarly arranged. A number of leads from other portions of the circuit illustrated in FIG. 6 also extend into the circuit of FIG. 7, and letters have been used to illustrate corresponding leads in FIGS. 6 and 7.

As shown in FIG. 7, leads B and C which extend from secondary winding 43 are connected to a bridge rectifier 51 which supplies power to a voltage regulator shown inside box 52. Thence, power is fed to a pair of timing circuits indicated in boxes 53 and 54 respectively. Timing circuit 54 is irrelevant to the present consideration and will be ignored at this stage of the description. Lead K, by way of which power is fed from switches 47, 48 to control circuit 7, is connected to one side of a Triac 55, the other side of which is connected via lead H to motor 33. Conduction through Triac 55 is controlled by timer circuit 53, which therefore controls supply of current to motor 33 when switches 47, 48 connect leads K and H to winding 42. Before motor 33 is started, switches 47, 48 feed power through control circuit 7; timer 53 permits a starting "pulse" to be fed to motor 33 which operates switches 47, 48 through a mechanism which will now be described.

As seen in FIG. 2, the shaft of control roller 18 extends through the right-hand upright of H-portion 14b and is provided at its end with a gear 56. When roller 18 is driven by sheet 17 gear 56 drives gear 57 on shaft 58 which is journaled in a pair of supporting walls 59. Shaft 58 extends through the right-hand wall 59 and carries at its end a pair of cams 61, 62 which operate switches 47, 48 respectively. The right-hand cam 62 is seen in greater detail in FIG. 5. Supported adjacent the cams are respective spring-loaded cam followers 60, 63. As seen in FIG. 5, the periphery of cam 62 is formed with four depressions 64. When cam follower 63 lies in one of the depressions 64, switch 48 feeds power along line K to control circuit 7. On the other hand, when follower 63 does not lie in a depression 64, switch 48 feeds power direct to motor 33. Cam 61 and follower cooperate in a substantially identical manner to cam 62 and follower 63, but cam 61 has only a single depression. Hence, when selector switch 46 places switch 47 in circuit, motor 33 will be energized for a complete revolution of control roller 18, whereas when switch 48 is in circuit, motor 33 is energized for only a quarter of a revolution of roller 18.

When motor 33 has been stopped by return of cam follower 60 or 63 to a depression, sheet 17 remains stationary for a delay period determined by variable resistor 65 in timer control circuit 53. At the end of the delay period, timer 53 permits another pulse to be fed to motor 33 to repeat the cycle. Resistor 65 is adjustable by means of a knob 67 mounted on panel 11, and rotatable relative to a scale marked on panel 11; the scale indicates those delay periods most commonly required, but resistor 65 is continuously variable. Knob 67 is also arranged to operate switch 68 connected in series with resistor 65; on opening of switch 68 the timer circuit is rendered inactive.

The delay period is chosen by the user of the machine to suit his own requirements, since it determines the length of time for which data remains in the observation window. If however, the user wishes to control the motor manually, he may render the control circuit inoperative as described above and cause a pulse to be fed to motor 33 via switch 69 which is operable by means of a button mounted on panel 11. It is not necessary, however, to render control circuit 7 inoperative to operative switch 69 and if desired, a definite delay period may be set and this may be shortened at will by operation of button switch 69.

During the delay period, the user may study the data appearing in the observation window. The user may check his answer to a question on the sheet by energizing lamps 27 which are fed from transformer winding 41 via a switch 72; switch 72 is operable by means of a button mounted on panel 11.

Where the user is learning a foreign language, it is particularly desirable that an opportunity should be given for practice of pronunciation of foreign words. Accordingly, the teaching machine includes a pair of tape recorders arranged so that a tutor may give a correct pronunciation of a word which appears in the observation window, and the user may then attempt his own pronunciation and have it played back to him.

The first tape recorder 74 is of the well-known cassette type and is mounted in panel 11 by means of a mounting strap 75 (FIG. 2) held on the rear of the panel by brackets 76. A microphone 77 is also mounted on the rear of panel 11 by means of a mounting bracket 78. As shown in FIG. 6, microphone 77 is connected to the input of recorder 74, so that a tutor may prerecord a tape which will be run with a particular sheet 17. During use of the machine, recorder 74 is maintained in the "playback" condition, and the tutor's comments are heard through speaker 79 (FIG. 1). Synchronization of tape recorder 74 with motor 33 will be described hereinafter.

The second tape recorder 81, which is indicated only in FIG. 6, is provided with an endless tape, and is permanently maintained in the "record" condition. Microphone 77 can be connected to the input of recorder 81 by way of a switch 82 which is mounted on panel 11. Recorder 81 is fed directly from the main supply as soon as switch 9 is closed; the tape therefore runs continuously and periodically the user will record an attempted pronunciation on it. Recorder 81 is fitted with additional playback head 84 through which its tape passes, and from which the output is fed to speaker 79 of recorder 74. Playback head 84 is so located in relation to the record head of recorder 81, that a word attempted by the user is played back to him after a short delay.

Power for tape recorder 74 is derived from control circuit 7 which also controls synchronization of the recorder with motor 33. The drive motor (not indicated) of recorder 74 is fed via lines D and F, controls of current in these lines being effected by timer circuit 54. The time for which current flows in lines D and F is controlled by a variable resistor shown at 85 in FIG. 7. Resistor 85 comprises a movable contact 86 operable by means of a knob 87 mounted on panel 11. The value of resistor 85 determines the period for which taper recorder 74 is operative, and therefore the period for which the tutor's comments will be heard from speaker 79. Circuit 54 is triggered to permit flow of current in lines D and F by a light sensitive resistor 88 located adjacent a lamp 89 which may be energized by way of lines K and T. Hence, as soon as motor 33 stops by reason of engagement of a cam follower with a depression, circuit 54 is triggered to cause flow of current in lines D and F to the motor of tape recorder 74. After a delay determined by resistor 85, flow of current to the tape recorder motor ceases. At the same time a lamp 91 connected between line F and one side of a capacitor 92, is energized. Lamp 91 is mounted in panel 11 and energization of this lamp indicates that the user may operate button 83 and speak into microphone 77 to record his own pronunciation on recorder 81 as described above. A controlled voltage for the amplifier of recorder 74 is derived from voltage regulator 52 by way of lines G and F.

Since it may be undesirable in some circumstances to have sounds issuing from speaker 79 of tape recorder 74, the recorder is also fitted with a pair of earphones 93. A selector switch 94, mounted on panel 11, permits recordings on the tapes of recorder 74 and 81 to be played back through earphone 93 instead of through speaker 79.

From time to time, it may be desired to use a sheet 17 of which the items each comprises a question to which there are a number of suggested responses. It is desirable in this case that the machine be arranged so that the sheet only moves to the next item if the student makes the correct response. In this type of operation, plates 21 and 28 are moved down relative to panel 11 until the portion of plate 28 abutting rib 23 engages the lower edge of opening 13. Three quarters of the length of sheet 17 aligned with opening 13 is then visible to the student, and space is provided for printing of several suggested responses to each question. Control circuit 53 is rendered inoperative by opening switch 68 as described above.

Located beside opening 13 are the buttons of switches 95, 96, and 97 shown in FIG. 6 in circuit with winding 41. Therefore, three responses may be indicated on sheet 17 each associated with a respective button switch 95, 96, 97. As will be described hereinafter, associated with buttons 95, 96, 97 is a wiper switch indicated at 98 in FIG. 6, so that when sheet 17 is aligned correctly with the observation window, only one of the button switches is connected in series with a relay 99 and winding 41. Upon pressing of the correct button, relay 99 is energized and closes switch 101 connected in parallel with switch 69. The operation of the motor in response to closing of switch 101 is the same as that described in relation to switch 69.

Switch 98 comprises a metal disc 102 journaled for rotation in walls 59 (FIG. 2). Disc 102 is provided with a coating of insulating material on one axial face and four resilient contacts 103, 104, 105 and 106 engage the coated face of the disc, so that as the disc rotates the contacts trace out respective tracks upon it. The coatings of the tracks traced by contacts 103, 104 and 105 are made intermittently discontinuous so that periodically during rotation of disc 102, one of contacts 103, 104 and 105 will be in contact with the metal of the disc. The disc metal is electrically connected to one end of winding 41. Contact 103 is connected to button switch 95, contact 104 to button switch 96 and contact 105 to button switch 97.

Disc 102 is driven from shaft 58 via a gear train comprising gears 107 and 108, there being a frictional connection between gear 108 and disc 102 to drive the latter. However, to ensure that disc 102 is always in the same position at the start of each program, and therefore to assist in synchronization of the discontinuities of the coating of disc 102 with the items on sheet 17, a separate manually operable drive is provided to permit adjustment of disc 102 apart from movement transmitted from motor 33. For this purpose, the periphery of disc 102 is cogged and cooperates with a gear 109 mounted for rotation with a shaft 111 which is supported behind panel 11. Also mounted on shaft 111 for rotation therewith is a wheel 112 aligned with an opening 113 in panel 11. Wheel 112 may therefore be operated by a user from the front of panel 11 to rotate disc 102 until contact 106 engages a single discontinuity formed in its track, at which time disc 102 is in its start position. When contact 106 engages the metal of disc 102, it completes a circuit which energizes lamp 114 (FIGS. 1 and 6) to indicate that the disc has reached its "start" position.

The invention is not limited to the details of the specific embodiments described above which includes many features which are optional. For instance, the multiple response circuits may not be required in some instances and can be omitted. The associated tape recorders are desirable features but are not essential to the invention; where such recorders are provided, alternative control systems to that described above could be produced by persons skilled in the art. Similarly, alternative motor control circuitry could be used without departing from the invention. The above and many other modifications fall within the spirit and scope of the invention as defined by the appended claims.

We claim:

1. A learning aid comprising means defining an observation window, support means adapted to support carrier means having a plurality of items of visual information thereon, drive means operable to move carrier means supported by said support means to present sequentially said items so that they can be viewed through said window, control means operable to cause intermittent operation of the drive means to provide a dwell period of predetermined duration each time an item is presented for viewing through said window, sound reproduction means operable to reproduce prerecorded audible signals, and operating means arranged to initiate operation of the sound reproduction means during each dwell period and including timing means operable to determine the portion of each dwell period for which the sound reproduction means remains operative, the operating means being responsive to the condition of said drive means to render said sound reproduction means inoperative while the drive means is effective in moving the carrier means.

2. A learning aid as claimed in claim 1 and comprising also sound recording and reproducing apparatus arranged such that sounds recorded thereon are automatically reproduced after a predetermined delay, and manually operable means for rendering said sound recording and reproducing apparatus operative to record, indicator means responsive to the condition of said sound reproduction means being provided to indicate the portion of each dwell period for which said sound reproduction means is inoperative so that said manually operable means may then be operated.

3. A learning aid as claimed in claim 1 wherein said timing means is adjustable to permit variation of the portion of each dwell period for which said sound reproduction means remains operative.

4. A learning aid as claimed in claim 1 wherein both said operating means and said drive means are operable by electric power, and said control means comprises switch means by way of which electric power is fed alternatively to said drive means or to said operating means, said switch means being responsive to cam means which are driven by said drive means simultaneously with said carrier means, said cam means being effective to operate said switch means to switch power from said drive means to said operating means when said carrier means has been moved a predetermined amount.

5. A learning aid comprising means defining an observation window, carrier means to carry a plurality of items of visual information, electrically operable drive means operable to move the carrier means to present sequentially said items so that they can be viewed through said window, control means operable to cause cyclic operation of said drive means, each cycle of said operation comprising a drive period in which the drive means is effective to move the carrier means, and a dwell period during which the drive means is ineffective to drive the carrier means and an item is presented for viewing through said window, sound reproduction means operable to reproduce audible signals, electrically operable operating means for said sound reproduction means, said control means comprising switch means by way of which electric power is fed alternatively to said drive means or to said operating means whereby said sound reproduction means is rendered operative at the start of each dwell period, and said operating means comprising timing means to determine the portion of each dwell period for which said sound reproduction means is maintained in the operative condition.

6. A learning aid as claimed in claim 5 and comprising also sound recording and reproducing apparatus arranged such that sounds recorded thereon are automatically reproduced after a predetermined delay, and manually operable means for rendering said sound recording and reproducing apparatus operative to record, speaker means common to said sound reproduction means and said sound recording and reproducing apparatus, and indicator means responsive to said timing means to indicate the expiry of the portion of each dwell period for which said sound reproduction means is maintained in the operative condition.

7. A learning aid as claimed in claim 5 wherein said control means includes further timing means effective to determine the length of said dwell period.

8. A learning aid as claimed in claim 5 wherein said switch means is responsive to cam means which is driven by said drive means simultaneously with said carrier means and is effective to cause operation of said switch means to switch power to said operating means when said carrier means has been moved by a predetermined amount.